(12) United States Patent
Takahashi

(10) Patent No.: US 10,645,313 B2
(45) Date of Patent: *May 5, 2020

(54) IMAGE SENSOR AND ELECTRONIC APPARATUS

(71) Applicant: Sony Semiconductor Solutions Corporation, Kanagawa (JP)

(72) Inventor: Tomohiro Takahashi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/545,559

(22) Filed: Aug. 20, 2019

(65) Prior Publication Data

US 2019/0373188 A1    Dec. 5, 2019

Related U.S. Application Data

(63) Continuation of application No. 15/745,226, filed as application No. PCT/JP2016/070432 on Jul. 11, 2016, now Pat. No. 10,412,327.

(30) Foreign Application Priority Data

Jul. 24, 2015 (JP) ................... 2015-146772

(51) Int. Cl.
*H04N 5/353* (2011.01)
*H04N 5/369* (2011.01)
(Continued)

(52) U.S. Cl.
CPC ......... *H04N 5/3535* (2013.01); *H04N 5/2353* (2013.01); *H04N 5/353* (2013.01);
(Continued)

(58) Field of Classification Search
CPC .............. H04N 5/3535; H04N 5/2353; H04N 5/37455; H04N 5/353; H04N 5/3745
See application file for complete search history.

(56) References Cited

U.S. PATENT DOCUMENTS

| 10,412,327 B2 * | 9/2019 | Takahashi ............ H04N 5/3535 |
| 2006/0103745 A1 | 5/2006 | Nagaishi et al. |

(Continued)

FOREIGN PATENT DOCUMENTS

| CN | 101626461 A | 1/2010 |
| CN | 104272721 A | 1/2015 |

(Continued)

OTHER PUBLICATIONS

International Search Report and English translation thereof dated Sep. 13, 2016 in connection with International Application No. PCT/JP2016/070432.

(Continued)

*Primary Examiner* — Twyler L Haskins
*Assistant Examiner* — Angel L Garces-Rivera
(74) *Attorney, Agent, or Firm* — Wolf, Greenfield & Sacks, P.C.

(57) ABSTRACT

The present technology relates to an image sensor and an electronic apparatus that make it possible to capture an image at different exposure time settings for individual pixel blocks each having a plurality of pixels.
A plurality of pixels for performing photoelectric conversion are disposed in an array in a pixel array section. Two or more pixels in the pixel array section form each of a plurality of pixel blocks. A plurality of selection sections, which are equal in number to the pixel blocks and disposed in an array, select the supply of an exposure control signal, which controls the exposure time of the pixels, to each of the pixel (Continued)

blocks. The present technology is applicable, for example, to an image sensor that captures an image.

12 Claims, 8 Drawing Sheets

(51) Int. Cl.
*H04N 5/3745* (2011.01)
*H04N 5/235* (2006.01)
(52) U.S. Cl.
CPC ........... *H04N 5/379* (2018.08); *H04N 5/3745* (2013.01); *H04N 5/37455* (2013.01)

(56) References Cited

U.S. PATENT DOCUMENTS

| | | |
|---|---|---|
| 2010/0007780 A1 | 1/2010 | Nishihara |
| 2013/0070139 A1 | 3/2013 | Kirsch |
| 2015/0077590 A1 | 3/2015 | Kuriyama et al. |
| 2015/0156428 A1 | 6/2015 | Uchida |
| 2018/0227514 A1 | 8/2018 | Takahashi |

FOREIGN PATENT DOCUMENTS

| | | |
|---|---|---|
| CN | 104683668 A | 6/2015 |
| JP | 2001-069408 A | 3/2001 |
| JP | 2006-157862 A | 6/2006 |
| JP | 2010-021697 A | 1/2010 |
| JP | 2013-070364 A | 4/2013 |
| JP | 2015-128284 A | 7/2015 |
| WO | WO 2013/164915 A1 | 11/2013 |

OTHER PUBLICATIONS

Written Opinion and English translation thereof dated Sep. 13, 2016 in connection with International Application No. PCT/JP2016/070432.

International Preliminary Report on Patentability and English translation thereof dated Feb. 8, 2018 in connection with International Application No. PCT/JP2016/070432.

Chinese Office Action dated Nov. 4, 2019 in connection with Chinese Application No. 201680042458.0 and English translation thereof.

* cited by examiner

IMAGE SENSOR AND ELECTRONIC APPARATUS

CROSS REFERENCE TO RELATED APPLICATIONS

The present application claims the benefit under 35 U.S.C. § 120 as a continuation application of U.S. application Ser. No. 15/745,226, filed on Jan. 16, 2018, now U.S. Pat. No. 10,412,327, which claims the benefit under 35 U.S.C. § 371 as a U.S. National Stage Entry of International Application No. PCT/JP2016/070432, filed in the Japanese Patent Office as a Receiving Office on Jul. 11, 2016, which claims priority to Japanese Patent Application Number JP 2015-146772, filed in the Japanese Patent Office on Jul. 24, 2015, each of which is hereby incorporated by reference in its entirety.

TECHNICAL FIELD

The present technology relates to an image sensor and an electronic apparatus, and more particularly to an image sensor and an electronic apparatus that make it possible, for example, to capture an image at different exposure time settings for individual pixel blocks each including a plurality of pixels.

BACKGROUND ART

For example, proposed is an image sensor that captures a high dynamic range image by using each single (horizontal) line of pixels at a long exposure time setting and at a short exposure time setting (refer, for instance, to PTL 1).

CITATION LIST

Patent Literature

PTL 1
  JP-A-2001-069408

SUMMARY

Technical Problem

Demanded in recent years is a technology for capturing an image at different exposure time settings for individual pixel blocks that each include a plurality of pixels.

The present technology has been made in view of the above circumstances in order to make it possible to capture an image at different exposure time settings for individual pixel blocks that each include a plurality of pixels.

Solution to Problem

An image sensor or electronic apparatus according to the present technology is an image sensor or an electronic apparatus having the image sensor, the image sensor including a pixel array section and a plurality of selection sections. The pixel array section is configured so that a plurality of pixels for performing photoelectric conversion are disposed in an array. Two or more pixels in the pixel array section form each of a plurality of pixel blocks. The selection sections, which are equal in number to the pixel blocks, select the supply of an exposure control signal, which controls the exposure time of the pixels, to each of the pixel blocks. The selection sections are disposed in an array.

In the image sensor or electronic apparatus according to the present technology, the pixel array section is configured so that a plurality of pixels for performing photoelectric conversion are disposed in an array. Two or more pixels in the pixel array section form each of a plurality of pixel blocks. The selection sections, which are equal in number to the pixel blocks and disposed in an array, select the supply of an exposure control signal, which controls the exposure time of the pixels, to each of the pixel blocks.

Another image sensor or electronic apparatus according to the present technology is an image sensor or an electronic apparatus having the image sensor, the image sensor including a pixel array section and a plurality of selection sections. The pixel array section is configured so that a plurality of pixels for performing photoelectric conversion are disposed in an array. Two or more pixels in the pixel array section form each of a plurality of pixel blocks. The selection sections, which are equal in number to the pixel blocks, select an exposure control signal to be supplied to each of the pixel blocks from among a plurality of exposure control signals that control the exposure time of the pixels and provide a plurality of different exposure time settings. The selection sections are disposed in an array.

In the other image sensor or electronic apparatus according to the present technology, the pixel array section is configured so that a plurality of pixels for performing photoelectric conversion are disposed in an array. Two or more pixels in the pixel array section form each of a plurality of pixel blocks. The selection sections, which are equal in number to the pixel blocks, select an exposure control signal to be supplied to each of the pixel blocks from among a plurality of exposure control signals that control the exposure time of the pixels and provide a plurality of different exposure time settings. The selection sections are disposed in an array.

Note that the image sensor may be an independent device or an internal block included in a device.

Advantageous Effect of Invention

The present technology makes it possible to capture an image at different exposure time settings for individual pixel blocks that each include a plurality of pixels.

Note that the advantageous effect of the invention is not always limited to the above-described one, but may be any advantageous effect described later in the present disclosure.

DESCRIPTION OF EMBODIMENTS

<Image Sensor According to Embodiment of Present Technology>

Figure 1:
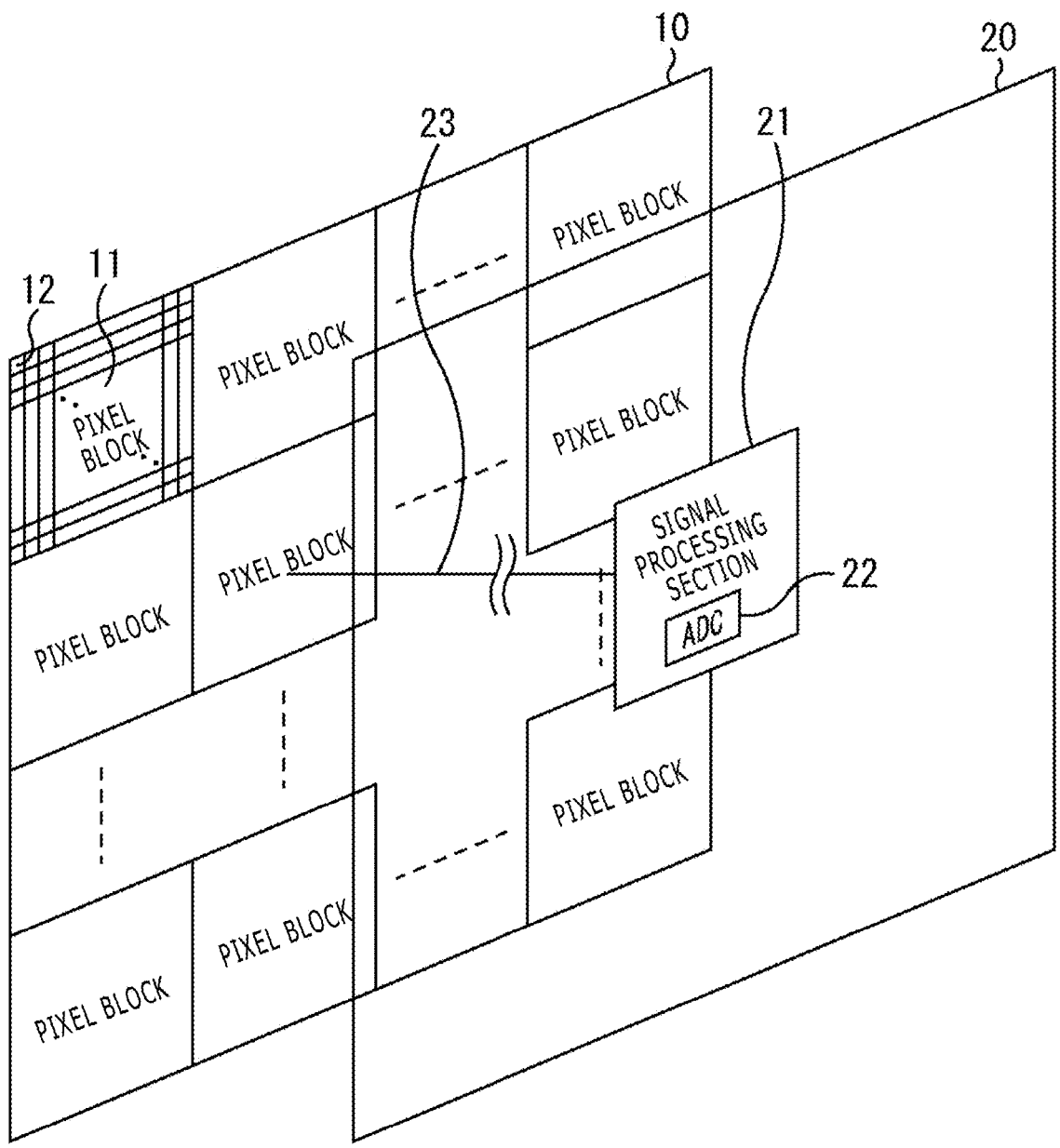
FIG. 1 is a perspective view illustrating an exemplary configuration of an image sensor according to an embodiment of the present technology.

FIG. 1 is a perspective view illustrating an exemplary configuration of an image sensor according to an embodiment of the present technology.

In FIG. 1, the image sensor is, for example, a CMOS (Complementary Metal Oxide Semiconductor) image sensor, and has a two-layer structure.

More specifically, the image sensor is formed in such a manner that a pixel array substrate 10 and a circuit substrate 20 are stacked on each other. The pixel array substrate 10 is a semiconductor substrate. The circuit substrate 20 is a semiconductor substrate different from the pixel array substrate 10.

The pixel array substrate (pixel array section) 10 is configured so that a plurality of pixels 12 for performing photoelectric conversion and outputting a pixel signal are disposed in an array. The pixel signal derived from photoelectric conversion by each pixel 12 on the pixel array substrate 10 is outputted to the circuit substrate 20.

The pixels 12 forming the pixel array substrate 10 are divided into pixel blocks 11 that each include two or more pixels 12. More specifically, the pixel array substrate 10 is divided into the pixel blocks 11 that each have an array of M horizontal pixels by N vertical pixels (M and N are 1 or an integer of 2 or greater). Each pixel block 11 may include a plurality of pixels 12 having an array, for example, of two or more horizontal pixels by two or more vertical pixels.

Signal processing sections 21 are disposed in an array on the circuit substrate 20. The signal processing sections 21 are equal in number to the pixel blocks 11 and have an array of M horizontal signal processing sections 21 by N vertical signal processing sections 21.

The signal processing sections 21 each include an ADC 22 and a signal processing circuit (not depicted). The ADC 22 performs AD conversion on a pixel signal that is an electrical signal outputted from the pixels 12 in the pixel blocks 11 on the pixel array substrate 10. The signal processing circuit performs various signal processing operations such as black level correction and image development. Each of the signal processing sections 21 further includes a later-described selection circuit 50 or (not depicted in FIG. 1). The selection circuit 50 or 70 supplies various signals for driving the pixels 12 to the pixels 12 in the pixel blocks 11 on the pixel array substrate 10.

On the circuit substrate 20, one signal processing section 21 has approximately the same size as one pixel block 11 and is disposed to face the one pixel block 11.

Each signal processing section 21 processes pixel signals outputted from the pixels 12 included in an opposing pixel block 11.

Consequently, it can be said that one pixel block 11 includes a set of pixels 12 that are subjected to signal processing by one signal processing section 21. Further, if it is assumed that a pixel block 11 as a set of pixels 12 subjected, for example, to signal processing by a signal processing section 21 is the pixel block 11 related to the signal processing section 21, it can be said that the signal processing section 21 on the circuit substrate 20 is disposed to face the related pixel block 11.

A signal processing section 21 is connected with a signal line 23 to a pixel block 11 related to the signal processing section 21 (a pixel block 11 positioned to face the signal processing section 21).

Pixel signals outputted from the pixels 12 in a pixel block 11 are supplied through the signal line 23 to a signal processing section 21 related to the pixel block 11. The ADC 22 included in the signal processing section 21 performs AD conversion on pixel signals that are supplied from the pixels 12 in the related pixel block 11 through the signal line 23.

The above AD conversion architecture is called an area ADC (AD Conversion) architecture. According to the area ADC architecture, pixel signal AD conversion can be performed in a parallel manner as needed to cover the number (M×N) of signal processing sections 21. The same is also true for signal processing other than AD conversion.

Note that the signal processing sections 21 may each include a memory that stores pixel data derived from AD conversion by the ADC 22. In such an instance, the memory included in each signal processing section 21 may be disposed on an additional substrate other than the circuit substrate 20 so that the image sensor has a three-layer structure obtained by stacking the pixel array substrate 10, the circuit substrate 20, and the additional substrate.

Further, although the image sensor depicted in FIG. 1 is obtained by stacking the pixel array substrate 10 and the circuit substrate 20, the image sensor may alternatively have a single-layer structure with the signal processing sections 21 on the circuit substrate 20 disposed on the pixel array substrate 10.

Furthermore, in FIG. 1, the area ADC architecture is adopted as the AD conversion architecture. Alternatively, however, a column parallel ADC architecture or other similar architecture may be adopted to simultaneously perform AD conversion on pixel signals of one line of pixels.

As stated above, the image sensor is not particularly limited to the above-described configuration of the signal processing sections 21 (e.g., whether or not the signal processing sections 21 are to be stacked on the pixel array substrate 10) and the above-described AD conversion architecture.

That is to say, the image sensor depicted in FIG. 1 is capable of capturing an image at different exposure time settings for individual pixel blocks 11 on the pixel array substrate 10, as described later. However, the capability of capturing an image at different exposure time settings for individual pixel blocks 11 is independent of the configuration of the signal processing sections 21 in the image sensor (e.g., whether or not the signal processing sections 21 are to be stacked on the pixel array substrate 10) and of the AD conversion architecture adopted by the image sensor.

Consequently, for example, no matter whether the area ADC architecture is adopted as the AD conversion architecture and no matter whether the column parallel ADC architecture is adopted, an image can be captured at different exposure time settings for the individual pixel blocks 11 as will be described later.

<Exemplary Configuration of Pixel 12>

Figure 2:
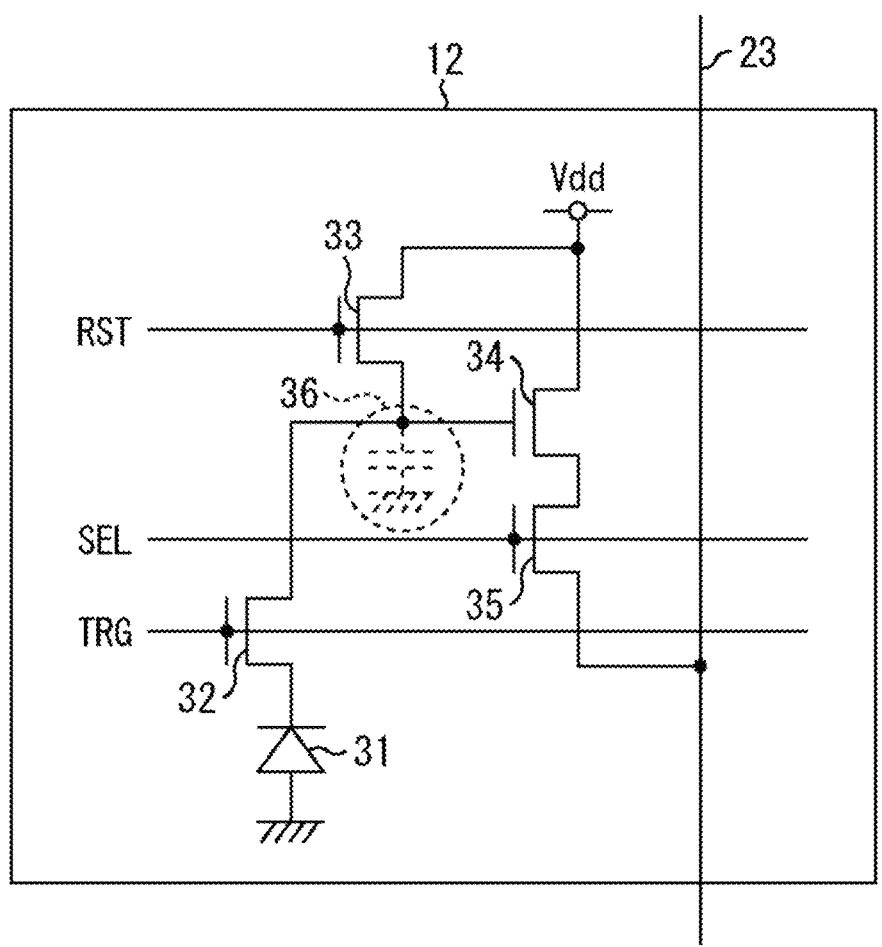
FIG. 2 is a circuit diagram illustrating an exemplary configuration of a pixel 12.

FIG. 2 is a circuit diagram illustrating an exemplary configuration of a pixel 12.

In FIG. 2, the pixel 12 includes a PD (Photo Diode) 31 and four NMOS (negative channel MOS) FETs (Field Effect Transistors) 32, 33, 34 and 35.

Further, in the pixel 12, the drain of the FET 32, the source of the FET 33, and the gate of the FET 34 are connected. At the point of such a connection, an FD (Floating Diffusion) (capacitance) 36 for converting an electrical charge to a voltage is formed.

The PD 31 is an example of a photoelectric conversion element that performs photoelectric conversion. The PD 31 receives incident light and performs photoelectric conversion by becoming charged with an electrical charge corresponding to the received incident light.

The anode of the PD 31 is connected to a ground (grounded). The cathode of the PD 31 is connected to the source of the FET 32.

The FET 32 is an FET that transfers the electrical charge charged into the PD 31 from the PD 31 to the FD 36. Thus, the FET 32 is hereinafter referred to also as the transfer Tr 32.

As described above, the source of the transfer Tr 32 is connected to the cathode of the PD 31, and the drain of the transfer Tr 32 is connected to the FD 36.

A transfer pulse TRG, which is one of control signals for driving (controlling) the pixel 12, is supplied to the gate of the transfer Tr 32.

Here, the control signals for driving the pixel 12 include a later-described reset pulse RST and selection pulse SEL in addition to the transfer pulse TRG.

The FET 33 is an FET that resets an electrical charge (voltage (potential)) charged into the FD 36. Thus, the FET 33 is hereinafter referred to also as the reset Tr 33.

The drain of the reset Tr 33 is connected to a power supply Vdd.

The reset pulse RST is supplied to the gate of the reset Tr 33.

The FET 34 is an FET that amplifies (buffers) the voltage of the FD 36. Thus, the FET 34 is hereinafter referred to also as the amplifier Tr 34.

The gate of the amplifier Tr 34 is connected to the FD 36. The drain of the amplifier Tr 34 is connected to the power supply Vdd. The source of the amplifier Tr 34 is connected to the drain of the FET 35.

The FET 35 is an FET that selects an output of a pixel signal (electrical signal) to the signal line 23. Thus, the FET 35 is hereinafter referred to also as the selection Tr 35.

The source of the selection Tr 35 is connected to the signal line 23.

The selection pulse SEL is supplied to the gate of the selection Tr 35.

Here, the source of the amplifier Tr 34 is connected to a current source (not depicted) through the selection Tr 35 and the signal line 23. Therefore, the amplifier Tr 34 forms an SF (Source Follower) so that the voltage of the FD 36 is outputted to the signal line 23 through the SF as a pixel signal.

The FD 36 is a region that is formed at the point of connection between the drain of the transfer Tr 32, the source of the FET 33, and the gate of the FET 34 in order to act as a capacitor for converting an electrical charge to a voltage.

Note that the pixel 12 may be configured without the selection Tr 35.

Further, the pixel 12 may include, in place of the selection Tr 35, two selection Trs, namely, a first selection Tr and a second selection Tr. In such an instance, the source of the first selection Tr is connected to the drain of the second selection Tr. Further, the drain of the first selection Tr is connected to the source of the amplifier Tr 34, and the source of the second selection Tr is connected to the signal line 23. A first selection pulse SEL_X is supplied to the gate of the first selection Tr, and a second selection pulse SEL_Y is supplied to the second selection Tr. In this instance, the first selection pulse SEL_X and the second selection pulse SEL_Y are able to select, from the pixel block 11, a pixel 12 that outputs a pixel signal to the signal line 23.

Further, the pixel 12 may have a shared pixel configuration such that the reset Tr 33 to FD 36 are shared by a plurality of sets of the PD 31 and the transfer Tr 32.

Furthermore, the pixel 12 may be configured so that a memory function for storing an electrical charge obtained by the PD 31 is incorporated to perform a global shutter operation.

Moreover, the selection Tr 35 may be disposed on the side of the drain of the amplifier Tr 34 although FIG. 2 indicates that the selection Tr 35 is disposed on the side of the source of the amplifier Tr 34.

In the pixel 12 configured as described above, the transfer pulse TRG and the reset pulse RST are temporarily changed to an H (High) level (from an L (Low) level). When the transfer pulse TRG and the reset pulse RST are changed to the H level, the transfer Tr 32 and the reset Tr 33 turn on. As a result, an electrical charge charged into the PD 31 and the FD 36 is transferred to the power supply Vdd. This resets the PD 31 and the FD 36.

The PD 31 receives light incident on it, and performs photoelectric conversion to generate an electrical charge based on the amount of received incident light.

When the transfer pulse TRG is changed to the L level after the PD 31 is reset, the PD 31 starts charging the electrical charge that is generated upon photoelectric conversion. Here, it is assumed for simplification of explanation that the selection pulse SEL is at the H level and that the selection Tr 35 is on.

When a predetermined exposure time elapses after the charge of electrical charge is started by the PD 31, the transfer pulse TRG is temporarily set to the H level, and the transfer Tr 32 is temporarily turned on.

The exposure time of the PD 31 (pixel 12) is an interval between the instant when the PD 31 is reset (and the transfer pulse TRG is set to the L level) and the instant when the transfer pulse TRG is temporarily set to the H level.

When the transfer Tr 32 turns on, the electrical charge charged into the PD 31 is transferred and charged into the FD 36 via the transfer Tr 32.

In this instance, the reset pulse RST is temporarily set to the H level before the transfer pulse TRG is temporarily set to the H level, and the reset Tr 33 is temporarily turned on.

When the reset Tr 33 turns on, the FD 36 is connected to the power supply Vdd via the reset Tr 33. Thus, the electrical charge in the FD 36 is transferred to the power supply Vdd via the reset Tr 33. This resets the FD 36.

After the FD 36 is reset, the transfer pulse TRG is temporarily set to the H level as described above, and the transfer Tr 32 is temporarily turned on.

When the transfer Tr 32 turns on, the electrical charge charged into the PD 31 is transferred and charged into the reset FD 36 via the transfer Tr 32.

A voltage (potential) corresponding to the electrical charge charged into the FD 36 is outputted, as a pixel signal, to the signal line 23 through the amplifier Tr 34 and the selection Tr 35.

In the ADC 22 (FIG. 1), a reset level, which is a pixel signal prevailing immediately after the reset of the FD 36, is subjected to AD conversion.

Further, in the ADC 22, a signal level (including a reset level and a level at which a pixel value prevails), which is a pixel signal (a voltage corresponding to the electrical charge charged into the PD 31 and transferred to the FD 36)

prevailing after the transfer Tr 32 is temporarily turned on, is subjected to AD conversion.

Furthermore, in the ADC 22, CDS (Correlated Double Sampling) is performed to determine, as a pixel value, the difference between the result of AD conversion of the reset level and the result of AD conversion of the signal level.

Note that CDS may be performed after or during the AD conversions of the reset level and signal level.

Figure 3:
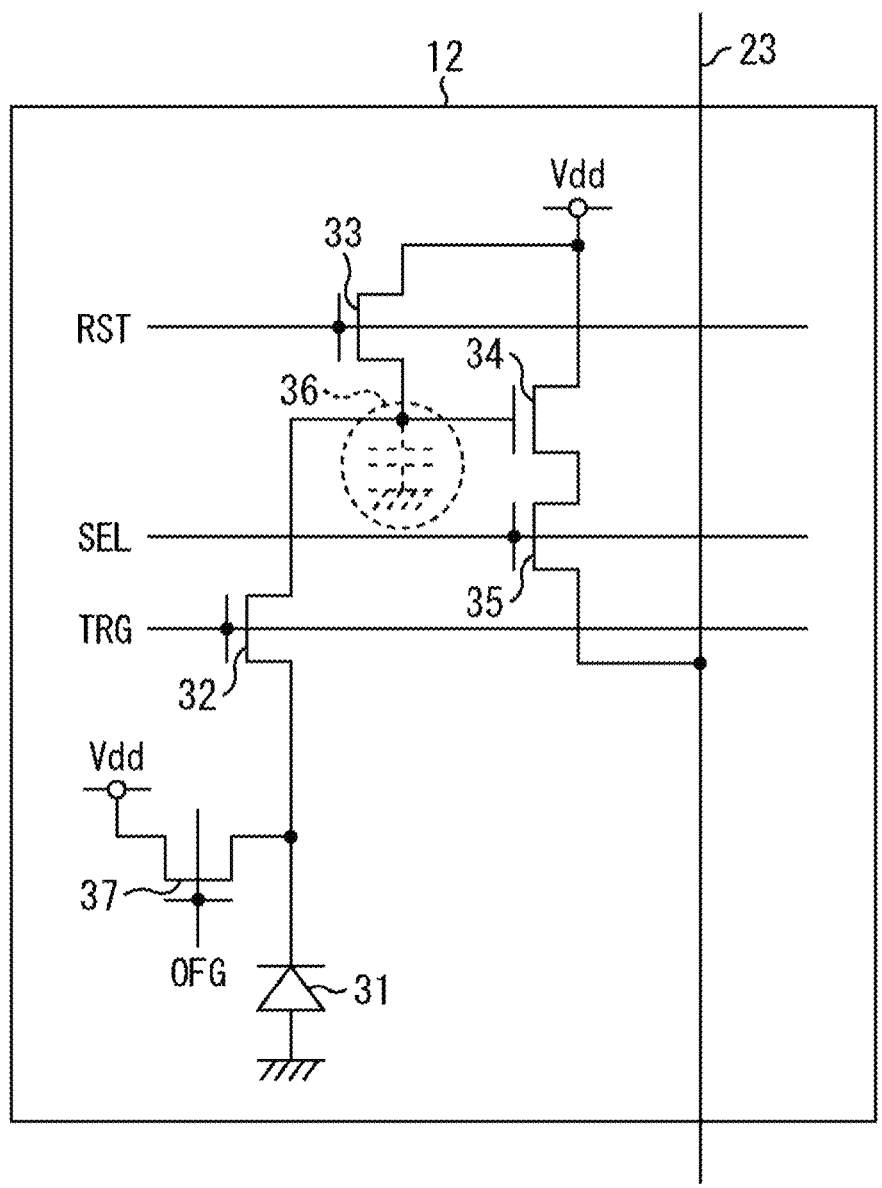
FIG. 3 is a circuit diagram illustrating another exemplary configuration of the pixel 12.

FIG. 3 is a circuit diagram illustrating another exemplary configuration of the pixel 12.

Note that elements identical with those depicted in FIG. 2 are designated by the same reference signs as the corresponding elements and will not be redundantly described.

In FIG. 3, the pixel 12 includes the PD 31, the FETs 32 to 35, the FD 36, and an NMOS FET 37.

Consequently, the pixel 12 depicted in FIG. 3 is similar to the pixel 12 depicted in FIG. 2 in that the former includes the PD 31 to FD 36.

However, the pixel 12 depicted in FIG. 3 differs from the pixel 12 depicted in FIG. 2 in that the former additionally includes the FET 37.

The FET 37 is an FET that discharges the electrical charge that is charged into the PD 31. Thus, the FET 37 is hereinafter referred to also as the discharge Tr 37.

The source of the discharge Tr 37 is connected to the cathode of the PD 31, and the drain of the discharge Tr 37 is connected to the power supply Vdd.

A discharge pulse OFG is supplied to the gate of the discharge Tr 37.

Here, the pixel 12 depicted in FIG. 3 is driven by four different control signals, namely, the discharge pulse OFG in addition to the earlier-described transfer pulse TRG, reset pulse RST, and selection pulse SEL.

In order to reset the PD 31 in the pixel 12 depicted in FIG. 2, it is necessary to set the transfer pulse TRG and the reset pulse RST to the H level and turn on the transfer Tr 32 and the reset Tr 33.

Meanwhile, the PD 31 in the pixel 12 depicted in FIG. 3 can be reset by setting the discharge pulse OFG to the H level and turning on the discharge Tr 37.

That is to say, when the discharge Tr 37 is turned on, the electrical charge charged into the PD 31 is transferred to the power supply Vdd via the discharge Tr 37. This resets the PD 31.

Note that the PD 31 in the pixel 12 depicted in FIG. 3 can also be reset by turning on the transfer Tr 32 and the reset Tr 33 or by turning on the discharge Tr 37.

However, if the transfer Tr 32 and the reset Tr 33 are turned on while the electrical charge charged into the FD 36 is being read, that is, a voltage corresponding to the electrical charge charged into the FD 36 is being outputted, as a pixel signal, to the signal line 23 through the amplifier Tr 34 and the selection Tr 35, the FD 36 from which the electrical charge is being read is reset. In this instance, the read of the electrical charge from the FD 36 is blocked.

Consequently, while the electrical charge charged into the FD 36 is being read, the transfer Tr 32 and the reset Tr 33 cannot be turned on.

Incidentally, even if the discharge Tr 37 is turned on, the FD 36 does not reset.

From the above, according to the discharge Tr 37, the PD 31 can be reset while the electrical charge charged into the FD 36 is being read.

Here, as explained with reference to FIG. 2, the exposure time of the pixel 12 is an interval between the instant when the PD 31 is reset and the instant when the transfer pulse TRG is temporarily set to the H level.

Consequently, it can be said that the transfer pulse TRG is an exposure control signal for controlling the exposure time. Further, it can be said that the discharge pulse OFG and the transfer pulse TRG and reset pulse RST required for resetting the PD 31 are also exposure control signals for controlling the exposure time, as is the case with the transfer pulse TRG.

<Exposure Time Control by Image Sensor>

Figure 4:
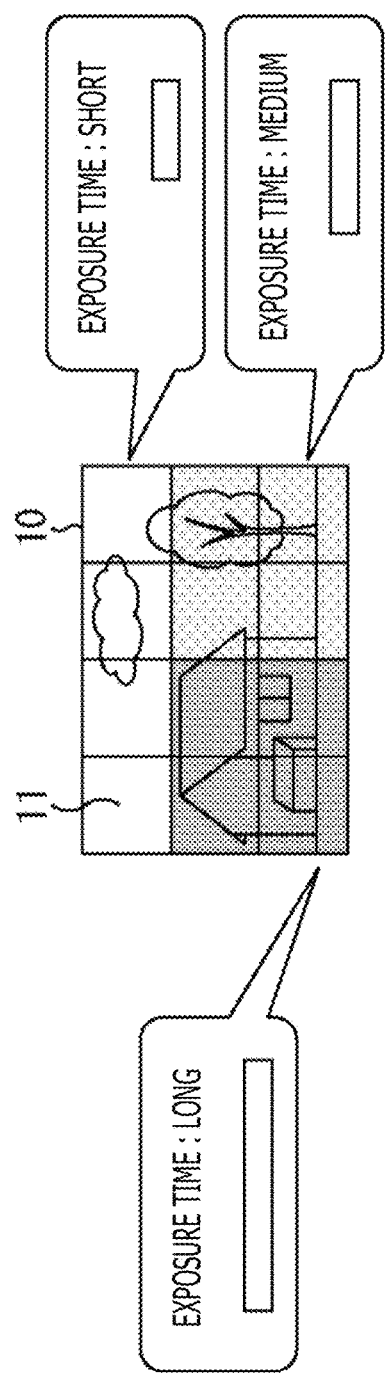
FIG. 4 is a diagram illustrating an overview of exposure time control by the image sensor.

FIG. 4 is a diagram illustrating an overview of exposure time control by the image sensor depicted in FIG. 1.

The image sensor is capable of capturing an image at different exposure time settings for the individual pixel blocks 11 on the pixel array substrate 10.

Consequently, an object reflected in a pixel block 11 can be imaged at an exposure time setting appropriate for the brightness of the object.

More specifically, for example, when an object reflected in a pixel block 11 is bright, the object can be imaged at a short exposure time setting; when an object reflected in a pixel block 11 is dark, the object can be imaged at a long exposure time setting; and when an object reflected in a pixel block 11 is neither bright nor dark, the object can be imaged at a medium exposure time setting.

When an imaging operation is performed at different exposure time settings for individual pixel blocks 11 as described above, it is possible to improve, for example, the characteristics of HDR (High Dynamic Range imaging) and compressive sensing, which are performed by using images captured by the image sensor.

Incidentally, an imaging operation may be performed at different exposure time settings for the individual pixel blocks 11 by wiring a control line for independently flowing an exposure control signal to each pixel block 11.

As mentioned earlier, there are three different exposure control signals, namely, the transfer pulse TRG, the reset pulse RST, and the discharge pulse OFG. However, it is assumed here for the sake of simplicity that only one type of exposure control signal is used (attention is paid to only one type of exposure control signal) as an exposure control signal.

If the pixel blocks 11 have an array of M horizontal pixel blocks by N vertical pixel blocks as described with reference to FIG. 1 in a situation where a control line for independently flowing an exposure control signal is wired to each pixel block 11, it is necessary to independently wire M×N control lines in a plane parallel to the pixel array substrate 10. If, for example, the number of pixel blocks 11 is equal to 256×256, it is necessary to independently wire 65,536 (=256×256) control lines.

It is difficult to wire such a large number of control lines to an increasingly downsized image sensor. If such wiring is made, the image sensor may become large in size due to the wiring of control lines.

Under the above circumstances, the present technology makes it possible to control the exposure time of each pixel block 11 while suppressing the number of control lines wired to flow control signals for controlling the exposure time.

<Detailed Exemplary Configurations of Circuit Substrate 20>

Figure 5:
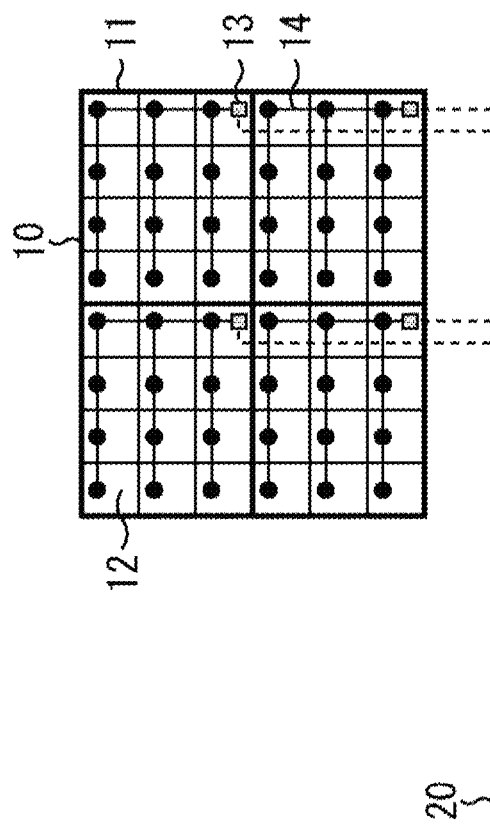
FIG. 5 is a diagram illustrating a first detailed exemplary configuration of a circuit substrate 20.
Figure 5:
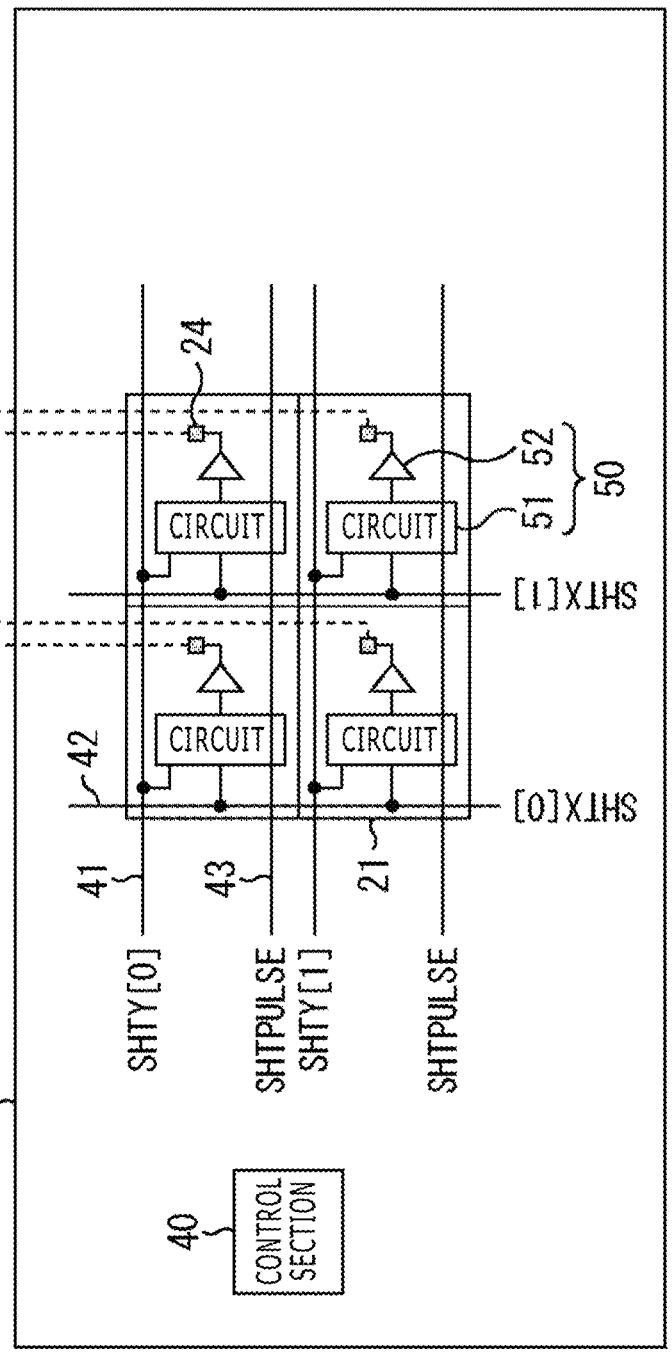

FIG. 5 is a diagram illustrating a first detailed exemplary configuration of the circuit substrate 20 depicted in FIG. 1.

As described with reference to FIG. 1, the circuit substrate 20 includes the same number of M×N signal processing sections 21 as the pixel blocks 11. The M×N signal processing sections 21 are disposed in an array.

Note that, for simplicity of drawing, FIG. 5 merely depicts 2×2 pixel blocks 11 on the pixel array substrate 10 and 2×2 signal processing sections 21 on the circuit substrate 20 that are associated with the 2×2 pixel blocks 11.

In addition to the M×N signal processing sections 21 disposed in an array, the circuit substrate 20 includes a control section 40, horizontal control lines 41, and vertical control lines 42. The number of horizontal control lines 41 is equal to the number N of vertically (longitudinally) arrayed signal processing sections 21. The number of vertical control lines 42 is equal to the number M of horizontally (transversely) arrayed signal processing sections 21.

The circuit substrate 20 further includes exposure control lines 43. The number of exposure control lines 43 is equal to the number N of vertically arrayed signal processing sections 21 and thus equal to the number of horizontal control lines 41.

The control section 40 controls the operation of the signal processing sections 21 (the later-descried selection circuit 50 for the signal processing sections 21) by flowing (supplying) a control signal to each of the horizontal control lines 41 and vertical control lines 42.

Further, the control section 40 supplies an exposure control signal SHTPULSE to the pixels 12 on the pixel array substrate 10 by flowing the exposure control signal SHTPULSE to the exposure control lines 43.

The horizontal control lines 41 are wired to individual rows of the M×N signal processing sections 21. Therefore, the number of wired horizontal control lines 41 is equal to the number N of rows of the signal processing sections 21 (the number of vertically arrayed signal processing sections 21).

The vertical control lines 42 are wired to individual columns of the M×N signal processing sections 21. Therefore, the number of wired vertical control lines 42 is equal to the number M of columns of the signal processing sections 21 (the number of horizontally arrayed signal processing sections 21).

Here, a control signal flowing in a horizontal control line 41 is referred to also as a horizontal control signal. The horizontal control signal flowing in the (n+1)th horizontal control line 41 from the top is referred to also as the horizontal control signal SHTY[n] (n=0, 1. . . . , N−1).

Further, a control signal flowing in a vertical control line 42 is referred to also as a vertical control signal. The vertical control signal flowing in the (m+1)th vertical control line 42 from the left is referred to also as the vertical control signal SHTX[m] (m=0, 1. . . . , M−1).

The exposure control lines 43 are, for example, wired along the horizontal control lines 41 to the individual rows of the M×N signal processing sections 21. Therefore, the number of wired exposure control lines 43 is equal to the number N of rows of the signal processing sections 21 (the number of vertically arrayed signal processing sections 21).

Note that a certain exposure control signal SHTPULSE flows simultaneously in N exposure control lines 43.

In FIG. 5, the signal processing sections 21 each include the selection circuit 50.

As described with reference to FIG. 1, the M×N signal processing sections 21, which are equal in number to the pixel blocks 11, are disposed in an array on the circuit substrate 20. Therefore, the number of selection circuits 50 is also equal to M×N. The M×N selection circuits 50 are disposed in an array.

The selection circuits 50 each include an arithmetic circuit 51 and a buffer 52.

In addition to the selection circuit 50, the signal processing sections 21 each include other signal processing circuits, such as the ADC 22 (FIG. 1), which are omitted from FIG. 5.

Further, a signal processing section 21 and a selection circuit 50 that are the (m+1)th from the left and the (n+1)th from the top are hereinafter referred to also as the signal processing section 21[m,n] and the selection circuit 50[m,n], respectively.

The horizontal control signal SHTY[n], which flows in the (n+1)th horizontal control line 41 from the top, and the vertical control signal SHTX[m], which flows in the (m+1)th vertical control line 42 from the left, are supplied to the arithmetic circuit 51 in the selection circuit 50[m,n].

Further, the exposure control signal SHTPULSE, which flows in the (n+1)th exposure control line 43 from the top, is supplied to the arithmetic circuit 51 in the selection circuit 50[m,n].

In accordance with the horizontal control signal SHTY[n] and the vertical control signal SHTX[m], the arithmetic circuit 51 in the selection circuit 50[m,n] chooses whether or not to supply the exposure control signal SHTPULSE, which flows in the (n+1)th exposure control line 43, to a pixel block 11 associated with the signal processing section 21[m,n] (this pixel block is hereinafter referred to also as the pixel block 11[m,n]).

More specifically, in accordance with the result of a predetermined logical operation on the input of the horizontal control signal SHTY[n] and vertical control signal SHTX[m], the arithmetic circuit 51 in the selection circuit 50[m,n] chooses whether or not to supply the exposure control signal SHTPULSE to the pixel block 11[m,n].

If, for example, the result of the predetermined logical operation on the input of the horizontal control signal SHTY[n] and vertical control signal SHTX[m], which is either the H (High) level or the L (Low) level, is the H level, the selection circuit 50[m,n] outputs the exposure control signal SHTPULSE, which is supplied from the exposure control line 43, to the buffer 52 in order to supply the exposure control signal SHTPULSE to the pixel block 11[m,n].

Further, if, for example, the result of the predetermined logical operation on the input of the horizontal control signal SHTY[n] and vertical control signal SHTX[m], which is either the H level or the L level, is the L level, the selection circuit 50[m,n] outputs, for example, the L level without outputting the exposure control signal SHTPULSE, which is supplied from the exposure control line 43, to the buffer 52 in order not to supply the exposure control signal SHTPULSE to the pixel block 11[m,n].

For the predetermined logical operation on the input of the horizontal control signal SHTY[n] and vertical control signal SHTX[m], for example, the AND or OR of the horizontal control signal SHTY[n] and vertical control signal SHTX[m] may be adopted.

When the AND of the horizontal control signal SHTY[n] and vertical control signal SHTX[m] is adopted for the predetermined logical operation on the input of the horizontal control signal SHTY[n] and vertical control signal SHTX[m], the exposure control signal SHTPULSE is supplied to the pixel block 11[m,n] only when the horizontal control signal SHTY[n] and the vertical control signal SHTX[m] are both at the H level. In other cases, the exposure control signal SHTPULSE is not supplied to the pixel block 11[m,n].

Further, when the OR of the horizontal control signal SHTY[n] and vertical control signal SHTX[m] is adopted for the predetermined logical operation on the input of the horizontal control signal SHTY[n] and vertical control signal SHTX[m], the exposure control signal SHTPULSE is not supplied to the pixel block 11[m,n] only when the horizontal control signal SHTY[n] and the vertical control signal SHTX[m] are both at the L level. In other cases, the exposure control signal SHTPULSE is supplied to the pixel block 11[m,n].

The buffer 52 buffers and outputs the output of the selection circuit 41.

The output terminal of the buffer 52 is connected, for example, to a via 24 that is disposed in each signal processing section 21 on the circuit substrate 20.

In each pixel block 11 on the pixel array substrate 10, a via 13 is disposed to face the via 24 in the associated signal processing section 21.

The via 13 in a pixel block 11 and the via 24 in the associated signal processing section 21 are electrically connected, for example, by a Cu junction. Therefore, the output of the buffer 52 is supplied to the pixel block 11 through the via 24 and the via 13.

In a pixel block 11, a distribution line 14 is wired in such a manner that the output of the buffer 52, which is to be supplied to the via 13, is distributed to the pixels 12 in the pixel block 11.

Here, in the pixel blocks 11 depicted in FIG. 5, a transverse wiring scheme is adopted so that the distribution line 14 is extended in a transverse direction (horizontal direction). However, the distribution line wiring scheme is not limited to the transverse wiring scheme. Alternatively, however, a longitudinal wiring scheme may be adopted so that the distribution line 14 is extended in a longitudinal direction (vertical direction). Another alternative is to wire the distribution line 14, for example, in a grid pattern.

In each pixel 12 in a pixel block 11, the distribution line 14 is connected to the gate of the transfer Tr 32, reset Tr 33, or discharge Tr 37 (FIGS. 2 and 3) to which the transfer pulse TRG, the reset pulse RST, or the discharge pulse OFG is given as the exposure control signal SHTPULSE.

Consequently, if the selection circuit 50 in a signal processing section 21 chooses to supply the exposure control signal SHTPULSE, the exposure control signal SHTPULSE is supplied to all pixels 12 in a pixel block 11 associated with the signal processing section 21.

If, by contrast, the selection circuit 50 in a signal processing section 21 does not choose to supply the exposure control signal SHTPULSE (chooses not to supply the exposure control signal SHTPULSE), the exposure control signal SHTPULSE is not supplied to any pixel 12 in a pixel block 11 associated with the signal processing section 21 (the L level is supplied instead).

According to the circuit substrate 20 depicted in FIG. 5, which is configured as described above, the supply of the exposure control signal SHTPULSE to the M×N pixel blocks 11 can be individually controlled by the horizontal control signal SHTY[n] flowing in the N horizontal control lines 41 and the vertical control signal SHTX[m] flowing in the M vertical control lines 42.

Consequently, for example, it is possible to supply an exposure control signal SHTPULSE, which provides a certain exposure time, to a certain pixel block 11 or a plurality of pixel blocks 11 and supply an exposure control signal SHTPULSE, which provides a different exposure time, to a different pixel block 11 or a plurality of different pixel blocks 11.

As a result, an image can be captured at different exposure time settings for individual pixel blocks 11. Further, control can be exercised by the exposure control signal SHTPULSE so as to provide a desired exposure time.

If the control lines for independently flowing exposure control signals are to be wired to the individual pixel blocks 11 as described with reference to FIG. 4 in a situation where, for example, there are 256×256 pixel blocks 11, it is necessary to independently wire 65,536 (=256×256) control lines in a plane parallel to the pixel array substrate 10.

Meanwhile, the circuit substrate 20 depicted in FIG. 5 merely requires the wiring of a total of 768 control lines, namely, 256 horizontal control lines 41, 256 vertical control lines 42, and 256 exposure control lines 43.

Consequently, it is possible to control the exposure time of each pixel block 11 while suppressing the number of control lines wired to flow control signals for controlling the exposure time.

Note that, as the predetermined logical operation on the input of the horizontal control signal SHTY[n] and vertical control signal SHTX[m], an exclusive OR or any other logical operation may be adopted in place of an AND operation or an OR operation. Further, as the predetermined logical operation on the input of the horizontal control signal SHTY[n] and vertical control signal SHTX[m], a combination of two or more logical operations may be adopted.

Figure 6:
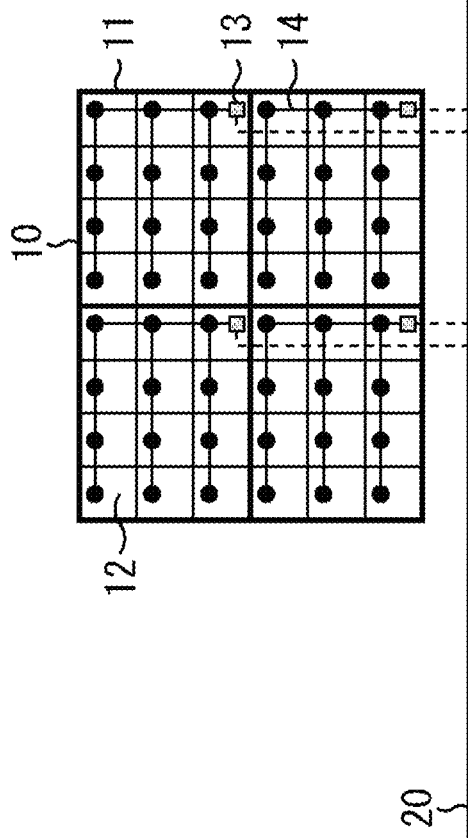
FIG. 6 is a diagram illustrating a second detailed exemplary configuration of the circuit substrate 20.
Figure 6:
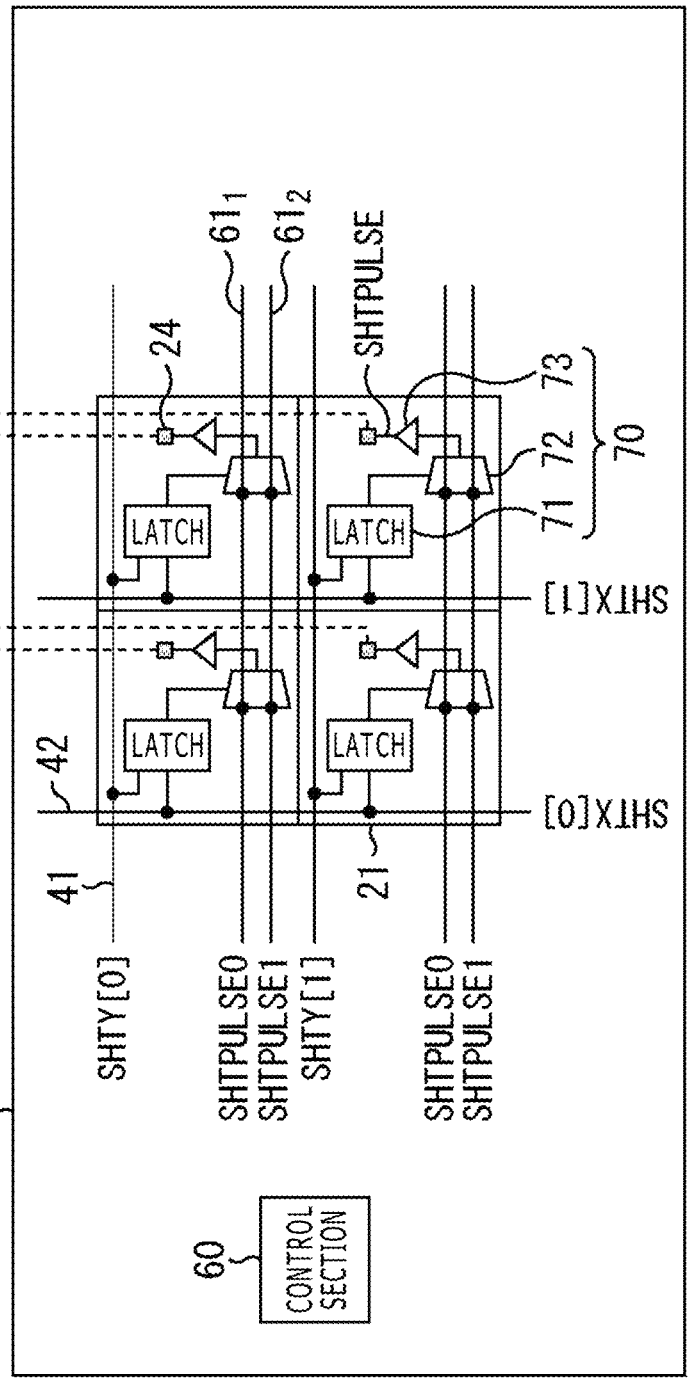

FIG. 6 is a diagram illustrating a second detailed exemplary configuration of the circuit substrate 20 depicted in FIG. 1.

Note that elements identical with those depicted in FIG. 5 are designated by the same reference signs as the corresponding elements and will not be redundantly described.

As described with reference to FIG. 1, the circuit substrate 20 includes the same number of M×N signal processing sections 21 as the pixel blocks 11. The M×N signal processing sections 21 are disposed in an array.

Note that, for simplicity of drawing, as is the case with FIG. 5, FIG. 6 merely depicts 2×2 pixel blocks 11 on the pixel array substrate 10 and 2×2 signal processing sections 21 on the circuit substrate 20 that are associated with the 2×2 pixel blocks 11.

In addition to the M×N signal processing sections 21 disposed in an array, the circuit substrate 20 includes a control section 60, horizontal control lines 41, and vertical control lines 42. The number of horizontal control lines 41 is equal to the number N of vertically arrayed signal processing sections 21. The number of vertical control lines 42 is equal to the number M of horizontally arrayed signal processing sections 21.

The circuit substrate 20 further includes K exposure control lines $61_1$ to $61_K$ in each row of the signal processing sections 21. K is an integer of 2 or greater.

In FIG. 6, the value 2 is adopted as K. Therefore, the circuit substrate 20 includes two exposure control lines $61_1$ and $61_2$ in each row of the signal processing sections 21. However, K is not limited to 2. A value other than 2. that is, an integer of 3 or greater may be adopted as K.

As is the case with the control section 40 depicted in FIG. 5, the control section 60 controls the operation of the signal processing sections 21 (a later-described selection circuit 70 for the signal processing sections 21) by flowing a control signal to each of the horizontal control lines 41 and vertical control lines 42.

Further, the control section 60 supplies an exposure control signal SHTPULSE #k−1 to the pixels 12 on the pixel array substrate 10 by flowing the exposure control signal SHTPULSE #k−1 to the exposure control lines $61_k$ (k=1, 2).

The exposure control lines $61_k$ are wired, for example, along the horizontal control lines 41 to individual rows of the M×N signal processing sections 21. Therefore, the number of wired exposure control lines $61_k$ is equal to the number N of rows of the signal processing sections 21 (the number of vertically arrayed signal processing sections 21).

Note that a certain exposure control signal SHTPULSE #k−1 flows simultaneously in N exposure control lines $61_k$.

Further, control is exercised so that a certain exposure control signal SHTPULSE #k−1 and another exposure control signal SHTPULSE #k'−1 provide different exposure time settings. Control is exercised, for example, so that an exposure control signal SHTPULSE0 provides a short exposure time, and that an exposure control signal SHTPULSE1 provides a long exposure time.

In FIG. 6, the signal processing sections 21 each include a selection circuit 70.

As described with reference to FIG. 1, the M×N signal processing sections 21, which are equal in number to the pixel blocks 11, are disposed in an array on the circuit substrate 20. Therefore, the number of selection circuits 70 is also equal to M×N. The M×N selection circuits 70 are disposed in an array.

The selection circuit 70 includes a latch circuit 71, a selector 72, and a buffer 73.

In addition to the selection circuit 70, the signal processing sections 21 each include other signal processing circuits, such as the ADC 22 (FIG. 1), which are omitted from FIG. 6.

Further, a selection circuit 70 that is the (m+1)th from the left and the (n+1)th from the top is hereinafter referred to also as the selection circuit 70[m,n].

The horizontal control signal SHTY[n], which flows in the (n+1)th horizontal control line 41 from the top, and the vertical control signal SHTX[m], which flows in the (m+1)th vertical control line 42 from the left, are supplied to the latch circuit 71 in the selection circuit 70[m,n].

The latch circuit 71 in the selection circuit 70[m,n] is a storage section that stores exposure time information indicative of exposure time in accordance with the horizontal control signal SHTY[n] and the vertical control signal SHTX[m].

Here, for example, the exposure time information may be adopted as the horizontal control signal SHTY[n], and a control signal for giving an instruction for writing information into the latch circuit 71 may be adopted as the vertical control signal SHTX[m].

When, for example, the vertical control signal SHTX[m] is temporarily set to the H level in the above instance, the exposure time information represented by the horizontal control signals SHTY[0] to SHTY[N−1] is stored (latched) in the latch circuits 71 in the selection circuit 70[m,0] to selection circuit 70[m,N−1] in the (m+1)th column from the left.

The exposure time information stored in the latch circuit 71 is supplied to the selector 72.

Here, for example, the exposure time set under the control of the exposure control signal SHTPULSE #k−1, thus the information representative of the exposure control signal SHTPULSE #k−1, may be adopted as the exposure time information.

Information of a minimum number of bits indicative of K values, that is, information, for example, of D bits indicative of only a minimum integer not smaller than $\log_2 K$, may be adopted as the exposure time information representative of the exposure control signal SHTPULSE #k−1. In this instance, the latch circuit 71 needs to have a storage capacity for storing information of at least D bits.

The exposure control signals SHTPULSE0 to SHTPUYLSE #K−1 flowing respectively in the (n+1)th exposure control lines $61_1$ to $61_K$ from the top are supplied to the selector 72 in the selection circuit 70[m,n].

The selector 72 in the selection circuit 70[m,n] is a signal selection section that, in accordance with the exposure time information from the latch circuit 71, selects the exposure control signal SHTPULSE to be supplied to a pixel block 11[m,n] associated with the signal processing section 21[m,n] from among the exposure control signals SHTPULSE0 to SHTPULSE #K−1 flowing respectively in the (n+1)th exposure control lines $61_1$ to $61_K$.

More specifically, from among the exposure control signals SHTPULSE0 to SHTPULSE #K−1 flowing respectively in the (n+1)th exposure control lines $61_1$ to $61_K$, the selector 72 in the selection circuit 70[m,n] selects an exposure control signal representative of exposure time information from the latch circuit 71 as the exposure control signal SHTPULSE to be supplied to a pixel block 11[m,n] associated with the signal processing section 21[m,n], and then supplies the selected exposure control signal to the buffer 73.

The buffer 73 buffers and outputs the output of the selector 72.

The output terminal of the buffer 73 is connected, for example, to the via 24 that is disposed in each signal processing section 21 on the circuit substrate 20.

In each pixel block 11 on the pixel array substrate 10, the via 13 is disposed to face the via 24 in the associated signal processing section 21.

The via 13 in a pixel block 11 and the via 24 in the associated signal processing section 21 are electrically connected, for example, by a Cu junction. Therefore, the output of the buffer 73 is supplied to the pixel block 11 through the via 24 and the via 13.

In a pixel block 11, the distribution line 14 is wired in such a manner that the output of the buffer 73, which is to be supplied to the via 13, is distributed to the pixels 12 in the pixel block 11.

In each pixel 12 in a pixel block 11, the distribution line 14 is connected to the gate of the transfer Tr 32, reset Tr 33, or discharge Tr 37 (FIGS. 2 and 3) to which the transfer pulse TRG, the reset pulse RST, or the discharge pulse OFG is given as the exposure control signal SHTPULSE.

Consequently, the exposure control signal SHTPULSE, which is selected by the selector 72 in the selection circuit 70 of a signal processing section 21 in accordance with the exposure time information stored in the latch circuit 71 from among the exposure control signals SHTPULSE0 to SHTPULSE #K−1, is supplied to all pixels 12 in a pixel block 11 associated with the signal processing section 21.

According to the circuit substrate 20 depicted in FIG. 6, which is configured as described above, the exposure time information representative of the exposure control signal SHTPULSE to be supplied to M×N pixel blocks 11 can be individually stored in the latch circuit 71 by the horizontal control signal SHTY[n] flowing in N horizontal control lines 41 and the vertical control signal SHTX[m] flowing in M vertical control lines 42.

Further, according to the circuit substrate 20 depicted in FIG. 6, the selector 72 can individually select the exposure control signals SHTPULSE to be supplied to M×N pixel blocks 11 from among K exposure control signals SHTPULSE0 to SHTPULSE #K−1 in accordance with the exposure time information stored in the latch circuit 71.

Consequently, for example, the exposure control signal SHTPULSE0 providing a certain exposure time can be supplied to a certain pixel block 11 or a plurality of pixel blocks 11, and the exposure control signal SHTPULSE1 providing a different exposure time can be supplied to a different pixel block 11 or a plurality of different pixel blocks 11.

As a result, an image can be captured at different exposure time settings for individual pixel blocks 11. Further, after the exposure time information is stored in the latch circuit 71, the exposure time of M×N pixel blocks 11 can be simultaneously controlled.

Here, if the control lines for independently flowing exposure control signals are to be wired to individual M×N pixel blocks 11 as described with reference to FIG. 4, it is necessary to independently wire M×N control lines in a plane parallel to the pixel array substrate 10.

Meanwhile, the circuit substrate 20 depicted in FIG. 6 requires the wiring of N horizontal control lines 41, M vertical control lines 42, and K×N exposure control lines 43, that is, a total of M+N+K×N control lines.

Consequently, controlling K makes it possible to control the exposure time of each pixel block 11 while suppressing the number of control lines wired to flow control signals for controlling the exposure time.

Note that the exposure time information to be stored in the latch circuit 71 can be rewritten, for example, in the unit of a frame.

Further, in FIG. 6, K exposure control signals SHTPULSE0 to SHTPULSE #K−1 can be handled as selection targets of the selector 72, and the exposure control signal SHTPULSE to be supplied to a pixel block 11 can be selected from among the K exposure control signals SHTPULSE0 to SHTPULSE#K−1. However, the number K of selection targets, thus, the number of selectable exposure time settings, is in a trade-off relation with the capacity of the latch circuit 71 and the number K of exposure control lines $61_1$ and $61_K$ to be wired to one row of the signal processing sections 21.

<Exemplary Uses of Imaging Element>

Figure 7:
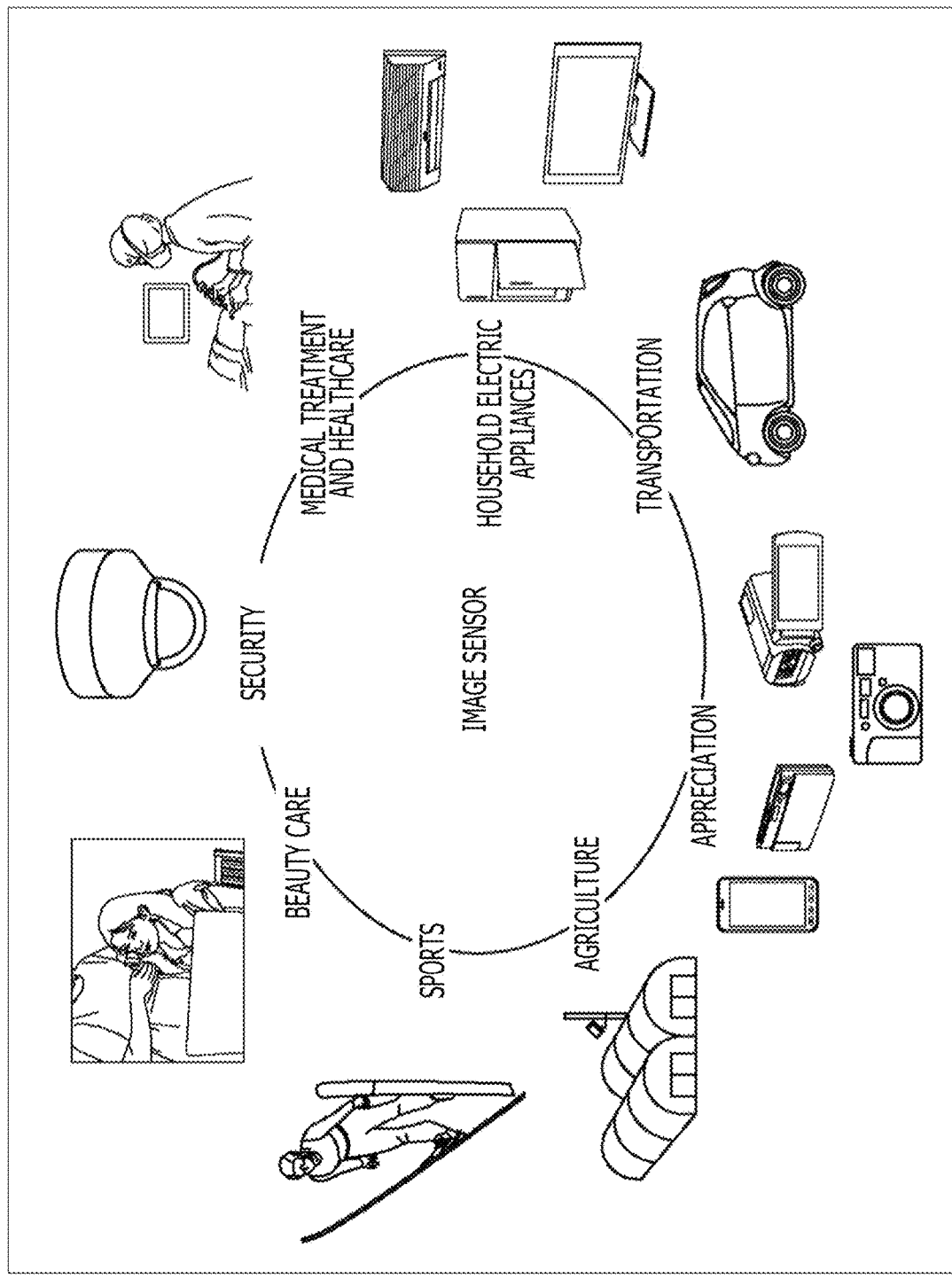
FIG. 7 is a diagram illustrating exemplary uses of the image sensor.

FIG. 7 is a diagram illustrating exemplary uses of the image sensor depicted in FIG. 1.

The above-described image sensor can be used, for example, in various electronic apparatuses that sense visible light, infrared light, ultraviolet light, X-ray light, or other light as indicated below.

- An electronic apparatus used to capture an image for appreciation, such as a digital camera or a mobile apparatus with a camera function
- An electronic apparatus used for transportation, such as a vehicle-mounted sensor for capturing an image of, for instance, a forward or rearward view from a vehicle, a view around the vehicle, or the interior of the vehicle in order, for example, to provide an automatic stop feature and other safety driving features and recognize the status of a driver of the vehicle, a monitoring camera for monitoring traveling vehicles and roads, or a distance measuring sensor for measuring, for example, an inter-vehicle distance
- An electronic apparatus used with a TV set, a refrigerator, an air conditioner, or other household electric appliance in order to capture an image of a user's gesture and operate such an electric appliance in accordance with the gesture
- An electronic apparatus used for medical treatment or healthcare, such as an endoscope, an electron microscope, or an angiographic instrument adapted to receive infrared light
- An electronic apparatus used for security purposes, such as a monitoring camera for crime prevention or a camera for personal authentication
- An electronic apparatus used for beauty care, such as a skin measuring instrument for capturing an image of skin or a microscope for capturing an image of a scalp
- An electronic apparatus used for sports, such as an action camera or a wearable camera for sporting and other events
- An electronic apparatus used for agriculture, such as a camera for monitoring the status of farms and farm products <Digital Camera Based on Image Sensor>

Figure 8:
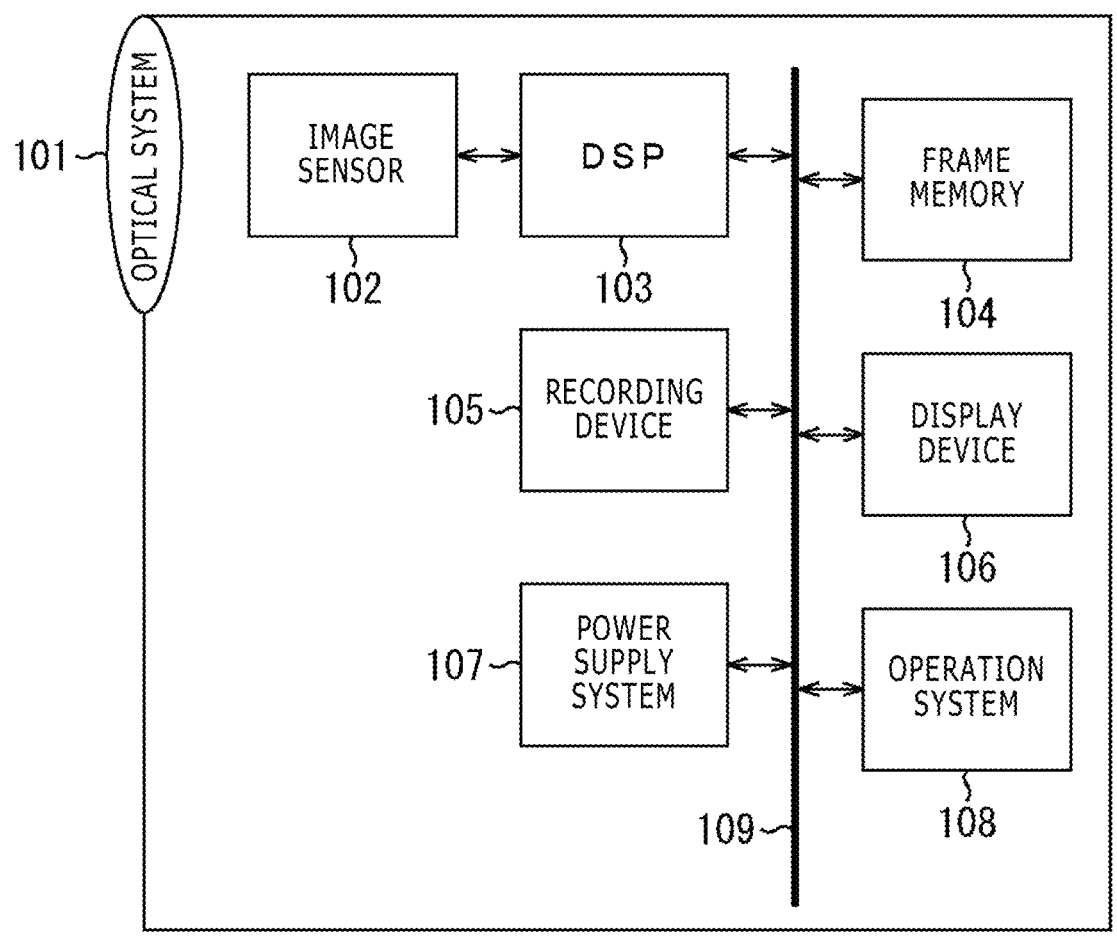
FIG. 8 is a block diagram illustrating an exemplary configuration of an embodiment of a digital camera that is one of electronic apparatuses to which the image sensor is applied.

FIG. 8 is a block diagram illustrating an exemplary configuration of an embodiment of a digital camera that is one of electronic apparatuses to which the image sensor depicted in FIG. 1 is applied.

The digital camera is capable of capturing both a still image and a motion image.

In FIG. 8, the digital camera includes an optical system 101, an image sensor 102, a DSP (Digital Signal Processor) 103, a frame memory 104, a recording device 105, a display device 106, a power supply system 107, an operation system 108, and a bus line 109. In the digital camera, the DSP 103 to operation system 108 are interconnected through the bus line 109.

The optical system 101 operates so that external light is concentrated on the image sensor 102.

The image sensor 102 has the similar configuration to the image sensor depicted in FIG. 1, receives the light from the optical system 101, converts the received light to an electrical signal, and outputs the electrical signal as image data.

The DSP 103 performs necessary signal processing on the image data outputted from the image sensor 102.

The frame memory 104 receives the image data that has been subjected to signal processing by the DSP 103, and temporarily retains the image data in the unit of a frame.

The recording device 105 uses a semiconductor memory, a hard disk, or other recording medium to record the image data on a motion image or still image captured by the image sensor 102.

The display device 106 is, for example, a liquid-crystal panel, an organic EL (Electro Luminescence) panel, or other panel-type display device, and displays an image (motion or still image) corresponding to the image data stored in the frame memory 104.

The power supply system 107 supplies necessary electrical power to the image sensor 102 to display device 106 and the operation system 108.

The operation system 108 outputs an operation command for various functions of the digital camera in response to a user operation.

Embodiments of the present technology are not limited to the foregoing embodiments. The foregoing embodiments may be variously modified without departing from the spirit and scope of the present technology.

Further, the advantageous effects described in the present specification are merely illustrative and not restrictive. The present technology can provide additional advantageous effects.

The present technology may adopt the following configurations.

<1>

An image sensor including:

a pixel array section having a plurality of pixels that are disposed in an array to perform photoelectric conversion; and a plurality of selection sections that are equal in number to a plurality of pixel blocks having two or more pixels in the pixel array section and select supply of an exposure control signal to each of the pixel blocks, the exposure control signal controlling exposure time of the pixels;

the selection sections being disposed in an array.

<2>

The image sensor as described in <1> above, in which the exposure time is controlled for each of the pixel blocks when the selection sections select the supply of the exposure control signal to the pixel blocks.

<3>

The image sensor as described in <1> or <2> above, further including:

horizontal control lines that are equal in number to the selection sections disposed in a vertical array; and vertical control lines that are equal in number to the selection sections disposed in a horizontal array;

the selection sections supplying the exposure control signal to the pixel blocks in accordance with a horizontal control signal supplied through the horizontal control lines and with a vertical control signal supplied through the vertical control lines.

<4>

The image sensor as described in any one of <1> to <3> above, in which the selection sections are disposed on a circuit substrate separate from the pixel array section; and the pixel array section and the circuit substrate are stacked on each other.

<5>

The image sensor as described in <1> or <2> above, further including:

a plurality of AD (Analog to Digital) conversion sections that perform AD conversion on an electrical signal derived from photoelectric conversion of the pixels and are equal in number to the pixel blocks.

<6>

The image sensor as described in <5> above, in which the selection sections and the AD conversion sections are disposed on a circuit substrate separate from the pixel array section; and the pixel array section and the circuit substrate are stacked on each other.

<7>

The image sensor as described in <6> above, in which the circuit substrate is configured so that the selection sections and the AD conversion sections are disposed to face the associated pixel blocks.

<8>

An electronic apparatus including:

an optical system that concentrates light;

an image sensor that receives the light to capture an image;

the image sensor including a pixel array section having a plurality of pixels that are disposed in an array to perform photoelectric conversion, and a plurality of selection sections that are equal in number to a plurality of pixel blocks having two or more pixels in the pixel array section and select supply of an exposure control signal to each of the pixel blocks, the exposure control signal controlling exposure time of the pixels, the selection sections being disposed in an array.

<9>

An image sensor including:

a pixel array section having a plurality of pixels that are disposed in an array to perform photoelectric conversion; and a plurality of selection sections that are equal in number to a plurality of pixel blocks having two or more pixels in the pixel array section and select an exposure control signal to be supplied to each of the pixel blocks from among a plurality of exposure control signals associated with a plurality of different exposure time settings, the exposure control signals controlling exposure time of the pixels;

the selection sections being disposed in an array.

<10>

The image sensor as described in <9> above, in which the exposure time is controlled for each of the pixel blocks when the selection sections select the exposure control signal to be supplied to the pixel blocks.

<11>

The image sensor as described in <9> or <10> above, in which the selection sections include a storage section that stores exposure time information indicative of the exposure time, and a signal selection section that selects the exposure control signal to be supplied to the pixel blocks in accordance with the exposure time information stored in the storage section.

<12>

The image sensor as described in any one of <9> to <11> above, in which the selection sections are disposed on a circuit substrate separate from the pixel array section; and the pixel array section and the circuit substrate are stacked on each other.

<13>

The image sensor as described in <9> or <10> above, further including:

a plurality of AD (Analog to Digital) conversion sections that perform AD conversion on an electrical signal derived from photoelectric conversion of the pixels and are equal in number to the pixel blocks.

<14>

The image sensor as described in <13> above, in which the selection sections and the AD conversion sections are disposed on a circuit substrate separate from the pixel array section; and the pixel array section and the circuit substrate are stacked on each other.

<15>

The image sensor as described in <14> above, in which the circuit substrate is configured so that the selection sections and the AD conversion sections are disposed to face the associated pixel blocks.

<16>

An electronic apparatus including:

an optical system that concentrates light;

an image sensor that receives the light to capture an image;

the image sensor including a pixel array section having a plurality of pixels that are disposed in an array to perform photoelectric conversion, and a plurality of selection sections that are equal in number to a plurality of pixel blocks having two or more pixels in the pixel array section and select an exposure control signal to be supplied to each of the pixel blocks from among a plurality of exposure control signals associated with a plurality of different exposure time settings, the exposure control signals controlling exposure time of the pixels,

REFERENCE SIGNS LIST

10 Pixel array substrate
11 Pixel block
12 Pixel
13 Via
20 Circuit substrate
21 Signal processing section
22 ADC
23 Signal line
24 Via
31 PD
32 to 35 FET
36 FD
37 FET
40 Control section
41 Horizontal control line
42 Vertical control line
43 Exposure control line
50 Selection circuit
51 Arithmetic circuit
52 Buffer
60 Control section
$61_1$, $61_2$ Exposure control line
70 Selection circuit
71 Latch circuit
72 Selector
73 Buffer
101 Optical system
102 Image sensor
103 DSP
104 Frame memory
105 Recording device
106 Display device
107 Power supply system
108 Operation system
109 Bus line

The invention claimed is:

1. A light detecting device comprising:
a pixel array section having a plurality of pixels that are disposed in an array to perform photoelectric conversion, the plurality of pixels being arranged in pixel blocks, each including two or more of the pixels;
a plurality of selection sections that select an exposure control signal for controlling exposure time of the pixels;
horizontal control lines that are equal in number to the selection sections disposed in a vertical array; and
vertical control lines that are equal in number to the selection sections disposed in a horizontal array,
the selection sections being disposed in an array and supplying the exposure control signal to the pixel blocks in accordance with a horizontal control signal supplied through the horizontal control lines and with a vertical control signal supplied through the vertical control lines,
wherein the exposure time is determined based on a brightness of an object reflected in a pixel block, the selection sections being disposed in an array.

2. The light detecting device as defined in claim 1, wherein, when the object reflected in the pixel block is relatively bright, the exposure time of the pixel block is relatively short.

3. The light detecting device as defined in claim 1, wherein, when the object reflected in the pixel block is relatively dark, the exposure time of the pixel block is relatively long.

4. The light detecting device as defined in claim 1, wherein the exposure time of the pixel block has an inverse relationship to the brightness of the object reflected in the pixel block.

5. A light detecting device comprising:
a pixel array section including a plurality of pixels that are disposed in a matrix, the pixel array including a first region and a second region, wherein each of the plurality of pixels includes a transfer transistor;
a control section configured to output a first control signal and a second control signal that control exposure time; and
a plurality of control signal lines including a first control signal line and a second control signal line,
wherein a gate of the transfer transistor of each pixel in the first region is configured to receive the first control signal via the first control signal line and a gate of the transfer transistor of each pixel in the second region is configured to receive the second control signal via the second control signal line, and
wherein a first exposure time controlled by the first control signal is different from a second exposure time controlled by the second control signal.

6. The light detecting device as defined in claim 5, wherein the pixel array further includes a third region and wherein a third exposure time of a pixel in the third region is between the first exposure time and the second exposure time.

7. The light detecting device as defined in claim 5, wherein the first exposure time and the second exposure time depend on brightness of objects reflected in the first region and the second region, respectively.

8. The light detecting device as defined in claim 5, wherein each of the first region and the second region is rectangular and includes two or more rows of pixels and two or more columns of pixels.

9. The light detecting device as defined in claim 5, wherein each of the first region and the second region is changeable in size depending on the object reflected in the respective region.

10. The light detecting device as defined in claim 5, wherein, when an object reflected in the first region is relatively bright, the exposure time of the first region is relatively short.

11. The light detecting device as defined in claim 10, wherein, when an object reflected in the second region is relatively dark, the exposure time of the second region is relatively long.

12. The light detecting device as defined in claim 5, wherein the exposure time of each of the first region and the second region has an inverse relationship to a brightness of an object reflected in the respective region.

* * * * *